United States Patent
Gorman et al.

[11] Patent Number: 6,124,054
[45] Date of Patent: Sep. 26, 2000

[54] PURGED ANODE LOW EFFLUENT FUEL CELL

[75] Inventors: Michael E. Gorman, Glastonbury; Bryan L. Murach, New Britain, both of Conn.

[73] Assignee: International Fuel Cells, LLC, South Windsor, Conn.

[21] Appl. No.: 09/220,470

[22] Filed: Dec. 23, 1998

[51] Int. Cl.[7] ................................................ H01M 2/02
[52] U.S. Cl. .......................... 429/34; 429/33; 429/38; 429/19; 429/30; 429/17
[58] Field of Search ................................ 429/33, 19, 30, 429/22, 17, 40, 64, 34, 38, 39

[56] References Cited

U.S. PATENT DOCUMENTS

| | | |
|---|---|---|
| 5,045,414 | 9/1991 | Bushnell et al. .......................... 429/17 |
| 5,047,299 | 9/1991 | Shockling ................................. 429/20 |
| 5,084,363 | 1/1992 | Reiser ...................................... 429/19 |
| 5,360,679 | 11/1994 | Buswell et al. .......................... 429/19 |
| 5,503,944 | 4/1996 | Meyer et al. ............................. 429/13 |
| 5,753,383 | 5/1998 | Cargnelli et al. ........................ 429/13 |
| 5,763,113 | 6/1998 | Meltser et al. ........................... 429/13 |
| 5,837,393 | 11/1998 | Okamoto ................................. 429/20 |
| 5,912,088 | 6/1999 | Ernst ........................................ 429/35 |

*Primary Examiner*—Maria Nuzzolillo
*Assistant Examiner*—Raymond Alejandro
*Attorney, Agent, or Firm*—M. P. Williams

[57] ABSTRACT

A hydrogen-fueled fuel cell reacts residual fuel in the exhaust of the anode flow field either in a catalytic converter or by feeding the anode exhaust into the cathode oxidant stream. Control of flow of anode exhaust into the cathode oxidant stream may be in response to a flammability sensor, a gas composition analyzer, current output, or periodically in response to a timer; the anode exhaust may be fed either upstream or downstream of the cathode air inlet blower.

19 Claims, 7 Drawing Sheets

PURGED ANODE LOW EFFLUENT FUEL CELL

TECHNICAL FIELD

This invention relates to dissipating residual fuel emanating from the anode flow field of a fuel cell, thereby permitting the flow to be sufficient to purge inert residue which accumulates on the anode side of the cell.

BACKGROUND ART

In all fuel cells, particularly where the oxidant is supplied by air, inert gaseous molecules, particularly nitrogen, diffuse through the electrolyte and accumulate on the fuel side (anode) of the cell. The accumulation of inert residue ultimately blocks the hydrogen fuel from reaching the anode catalyst and the electrolyte, which ultimately leads to significant loss of cell performance. Exhausting or venting of effluent from the anode, which invariably will contain residual fuel, is undesirable in most instances because unreacted fuel can pose a safety hazard and will generally be perceived as polluting the atmosphere. Typical fuel cell power plants are designed for operation on hydrocarbon fuels (natural gas, methanol or gasoline) and usually utilize the anode exhaust as a source of fuel for a burner required in the apparatus that processes the fuel to make it a hydrogen-rich stream; all fuel in the anode exhaust is combusted, so that no unburned fuel will leave the power plant.

Although some space and military applications have utilized hydrogen-fueled fuel cell power plants, with no fuel processor, and either dead ended the anode (not allowing any effluent therefrom) or simply dumped the anode exhaust into the environment, there are other uses for hydrogen-fueled power plants, particularly in vehicles such as automobiles, which can neither tolerate the performance degradation which can be caused by buildup of inert residues on the anode side nor tolerate a fuel-containing exhaust. A dead-ended fuel stream causes trace level impurities to accumulate, which requires a fuel-exit purge into the ambient.

DISCLOSURE OF INVENTION

Objects of the invention include provision of a hydrogen-fueled fuel cell which has sufficient flow in the anode flow field to purge the anode of inert residue, while providing fuel-free exhaust into the ambient.

According to the present invention, a fuel cell anode exhaust is combusted by catalytic reaction with the oxidant, typically air, before being exhausted to ambient atmosphere. In accordance with a first form of the invention, the anode exhaust is fed to the cathode inlet manifold so that the unreacted hydrogen can mix with the inlet air and safely react on the platinum catalyst on the cathode side of the fuel cell, to eliminate substantially all hydrogen from the emissions of the cathode side of the cell. Reaction of the hydrogen on the cathode side forms water which has an additional benefit, in some fuel cells such as proton exchange membrane (PEM) fuel cells, of improving the water balance of the fuel cell, because it adds to the process water produced in the normal electrochemical reaction of the cell. In this form of the invention, the anode exhaust may be applied either ahead of or behind the air blower, and the rate of flow of anode exhaust mixed with inlet air can be controlled in response to the hydrogen content in the inlet air, the gas analysis of the anode effluent, the current being supplied by the fuel cell to a load, or other parameters. The exhaust flow from the anode can either be metered continuously, at a steady or varying rate, or can be turned on and off thereby to provide periodic purging according to a predetermined schedule. According to the invention in another form, the anode effluent may be passed through a catalytic converter (mechanically similar to those conventionally used in motor vehicles to convert nitrogen oxides, carbon monoxide and unbonded hydrocarbons) thereby to consume hydrogen before venting to atmosphere, such as in the exhaust of a fuel cell powered electric automobile.

BEST MODE FOR CARRYING OUT THE INVENTION

An exemplary PEM fuel cell in which the present invention may be practiced is shown in U.S. Pat. No. 5,503,944. As is known, a fuel cell system or power plant is comprised of many fuel cells disposed adjacent to each other so as to form a cell stack assembly. Referring to the FIG. 1, each component cell will include a membrane 8; an anode substrate 10, and an anode catalyst layer 12; a cathode substrate 18, and a cathode catalyst layer 20; an anode flow field plate 2'; and a cathode flow field plate 2. The flow field plates 2 and 2' are positioned back-to-back with the projections 4 and 4' being disposed in face-to-face contact. The grooves 6 and 6' combine to form coolant water flow fields on the anode and cathode sides of the electrolyte membrane 8. The projections 14' abut the anode substrate 10; and the projections 14 abut the cathode substrate 18. The grooves 16' thus form the anode reactant flow field; and the grooves 16 form the cathode reactant flow field.

Figure 1:
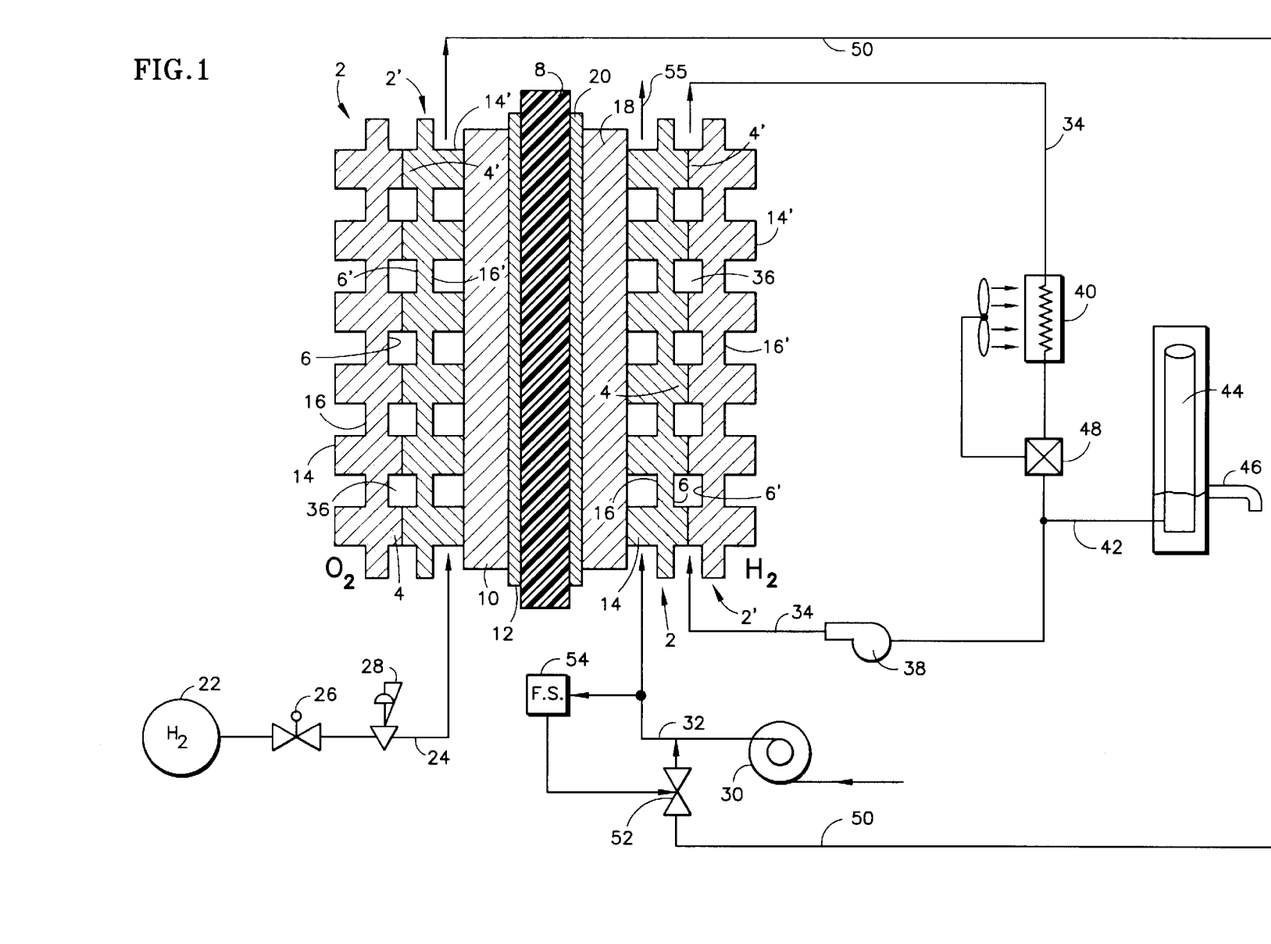
FIGS. 1–5 are stylized, schematic diagrams of a portion of a fuel cell system in which the present invention is effected by passing the anode exhaust through the cathode flow field.

FIG. 1 also shows, schematically, the system components of the cell stack assembly. All of the anode reactant flow fields 16' in the power plant are supplied with a hydrogen-rich fuel gas reactant from a supply source tank 22 thereof. The hydrogen reactant flows from the supply source 22 to the anode flow fields 16' through a supply line 24. The amount and pressure of hydrogen-rich fuel flowing through the supply line 24 is controlled by a supply valve 26 and a supply regulator 28 which may be manually or automatically operated. All of the cathode flow fields 16 are supplied with an oxidant, such as air, via an air blower 30 and an air line 32. The oxygen used in the electrochemical reaction is thus derived from ambient air in this embodiment.

Coolant water is circulated through the power plant cell units via lines 34. The coolant water passes through coolant passages 36 between the plates 2 and 2'. Coolant water is circulated by a pump 38, which can be a fixed or variable speed pump. The coolant water circulating loop includes a heat exchanger 40 which lowers the temperature of the water exiting from the coolant passages 36. A branch line 42 leads from the line 34 to a reservoir 44 that may be open to ambient surroundings. Excess water formed by the electrochemical reaction, i.e., product water, is bled into the reservoir 44 by way of the line 42. Thus the reservoir 44 provides a recipient of system product water. A drain spout 46 allows releasing excess water to ambient. The heat exchanger will preferably be controlled by a thermostat 48 which senses the temperature of the water stream exiting the heat exchanger 40.

In accordance with the invention, the anode flow fields 16' are connected by a line 50 through a valve 52 to the air inlet line 32, the valve 52 may be operated in response to a flammability sensor 54 which will assure that the amount of hydrogen introduced into the air inlet line 32 will remain well below 4%, thereby avoiding a hazardous condition. The hydrogen, with water vapor, provided to the air inlet 32 through the valve 52 is passed into the cathode flow field 16, where it will react on the cathode catalyst layer 20 (with the oxygen in the air) so as to provide heat and water. The exhaust of the cathode flow field 16, illustrated by the arrow 55, will have substantially no hydrogen in it, thereby being perfectly safe and non-polluting. In a typical PEM fuel cell, the hydrogen content in the anode exhaust may be 50%–90%. The fuel purge flow is set such that the volumetric concentration of hydrogen at the mix point in line 32 is always less than 4% and typically less than 1% and is therefore quite safe for introduction into the cathode flow field without any danger. As can be seen by reference to FIG. 7, fuel cell operation and temperature are hardly affected at all by introducing the anode exhaust into the cathode air stream.

Figure 2:
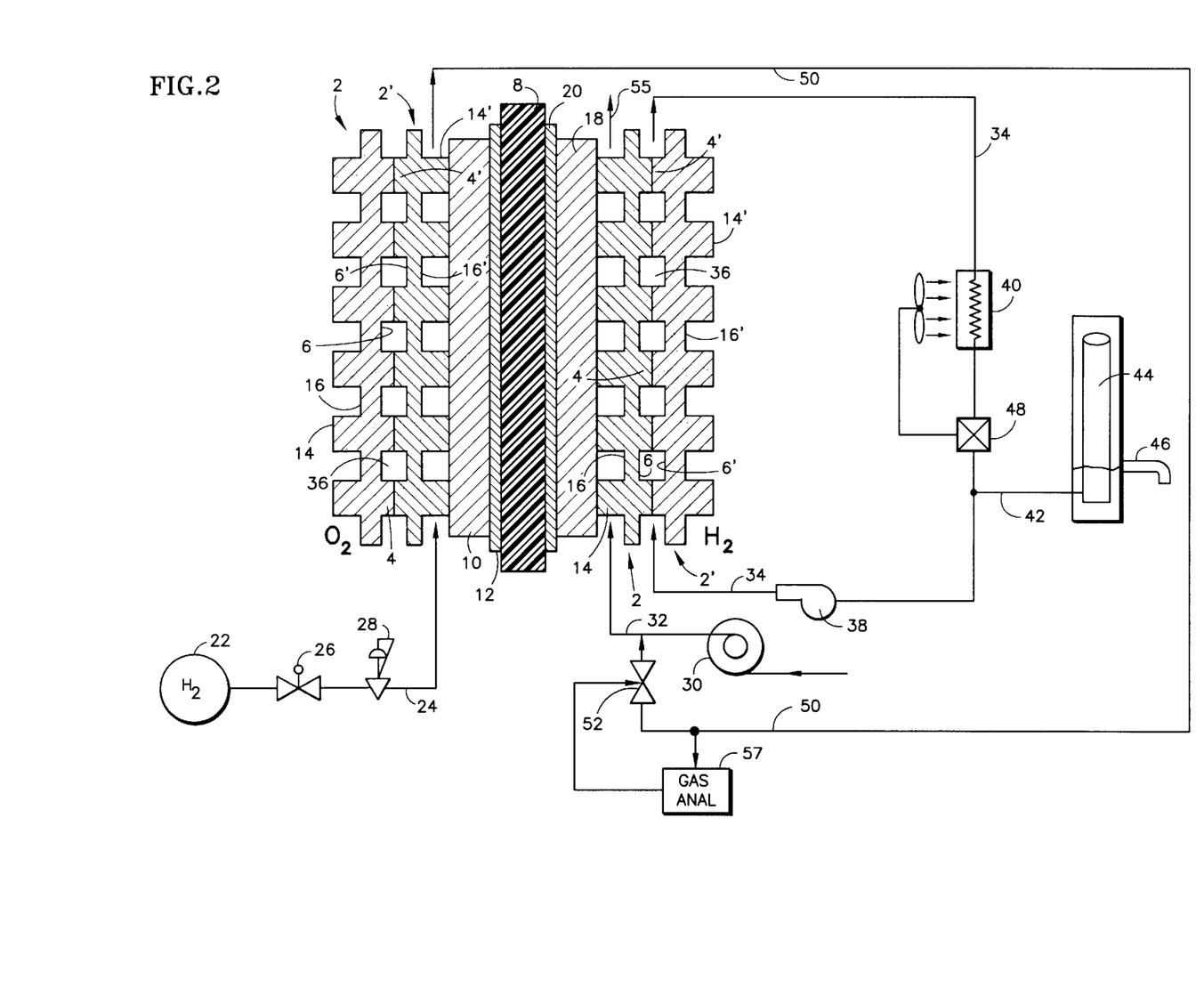
Figure 3:
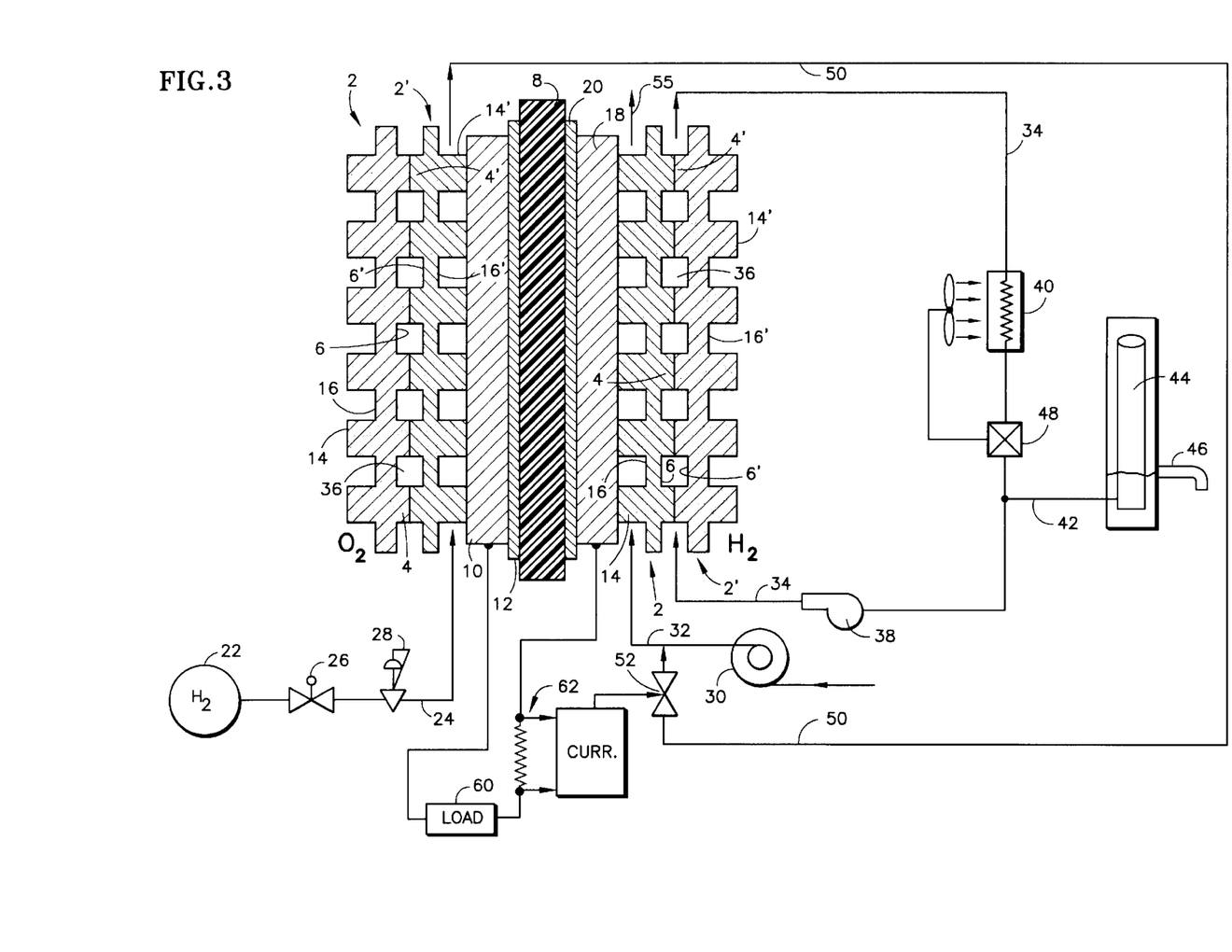
Figure 4:
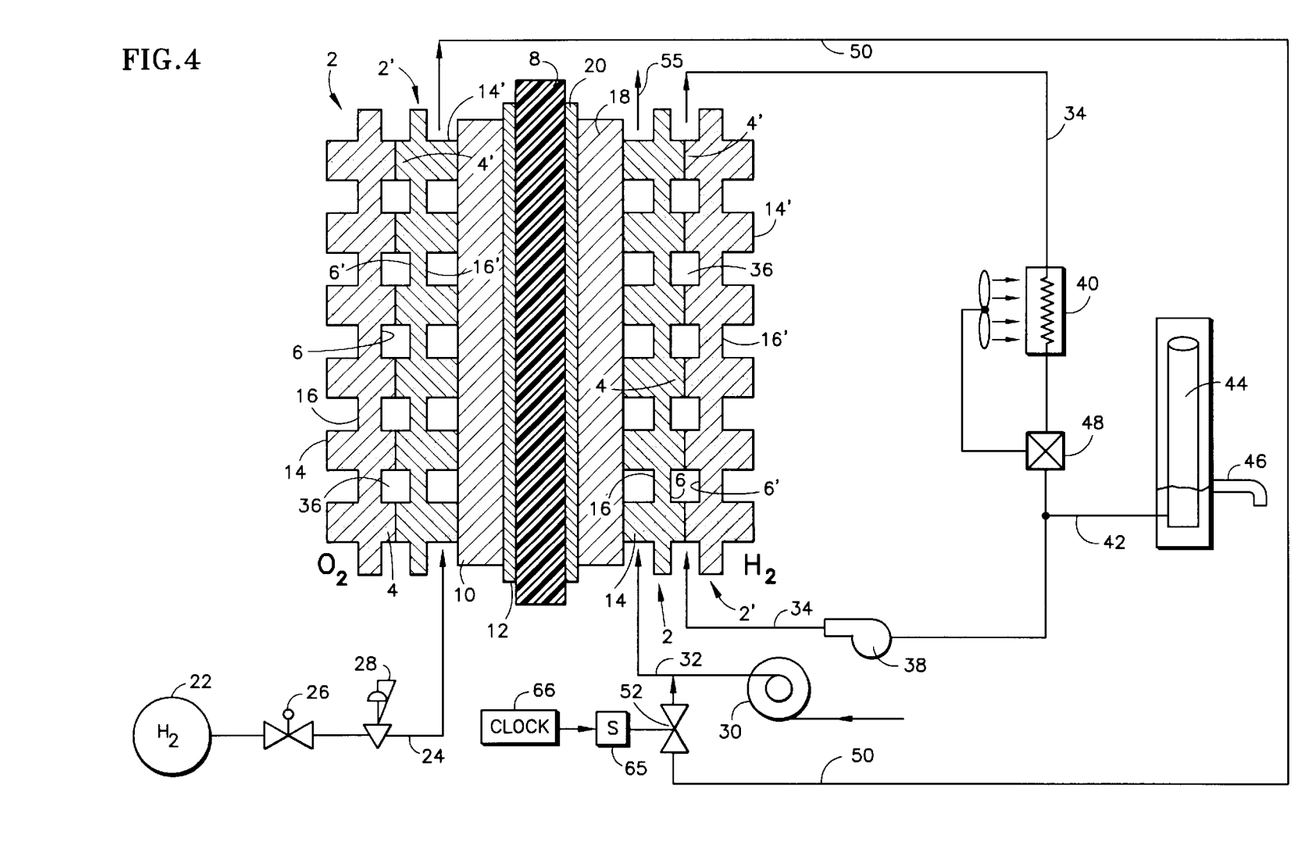
Figure 5:
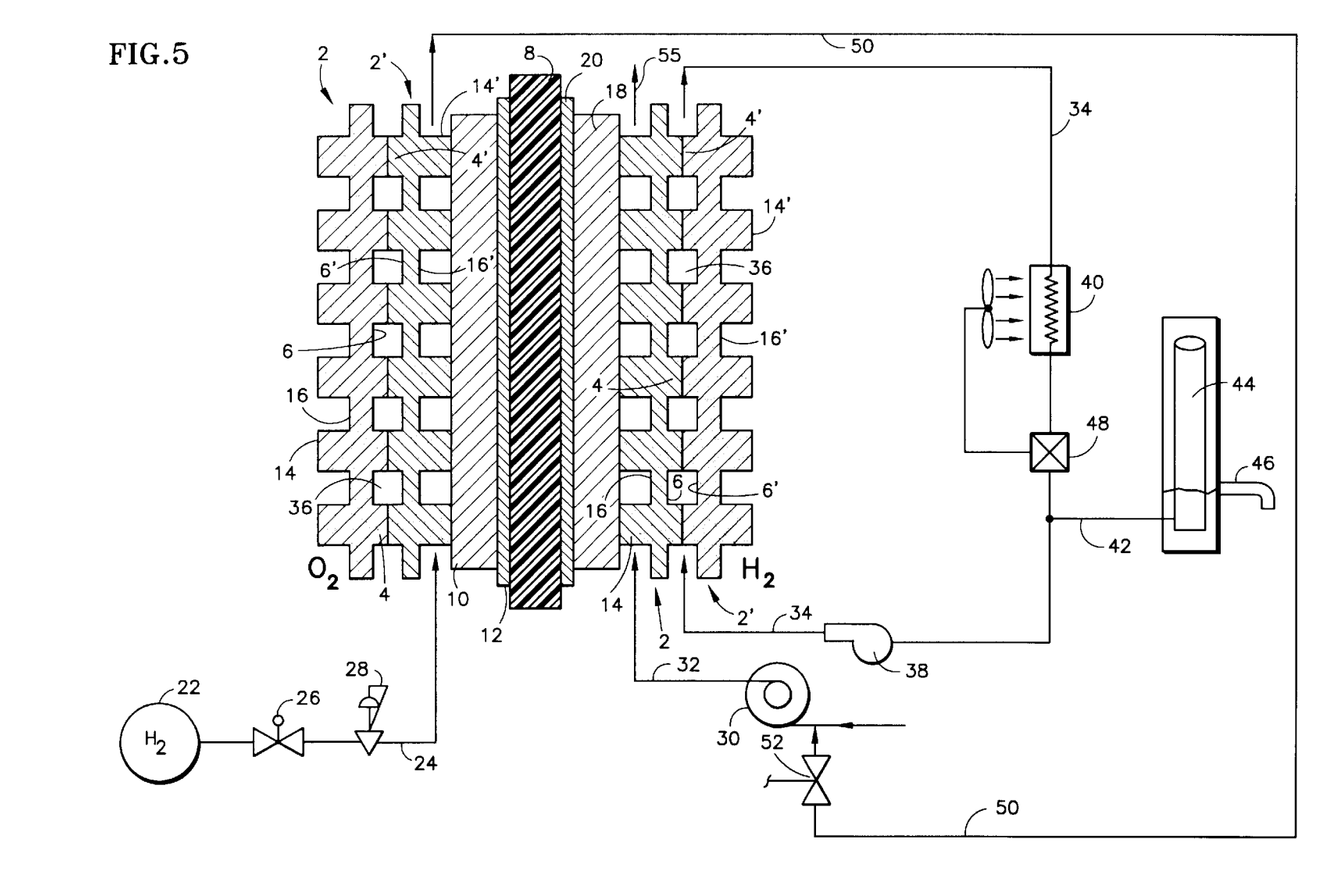

An embodiment of the invention shown in FIG. 2 is identical to that of FIG. 1, except that a gas composition analyzer 57 monitors the content of the anode exhaust in the line 50, and controls the valve 52 accordingly. An embodiment of the invention shown in FIG. 3 is identical to that of FIG. 1, except that the valve 52 is controlled by current in the fuel cell load 60 as indicated by a conventional current detector 62. An embodiment of the invention illustrated in FIG. 4 is identical to that of FIG. 1 except that the valve 52 is controlled by a solenoid 65 in response to a clock 66 so as to periodically open and purge the anode flow field for a predetermined time. Other methodology may be utilized to control the valve 52. An embodiment of the invention illustrated in FIG. 5 is similar to that of FIG. 1 except that the valve 52 is connected to the inlet of the blower 30, rather than to its outlet. The manner of controlling the valve 52 may be in accordance with any of the methodologies mentioned hereinbefore, or otherwise. The point of applying the anode exhaust to the cathode inlet air stream, and whether or how the anode exhaust flow is controlled, are both irrelevant to the present invention, which in this form simply provides the anode effluent, at least some of the time, to the cathode flow field so as to combust all remaining fuel, thereby permitting purging of inerts from the anode side of the cell without polluting the atmosphere or risking a safety hazard due to fuel in the exhaust.

Figure 7:
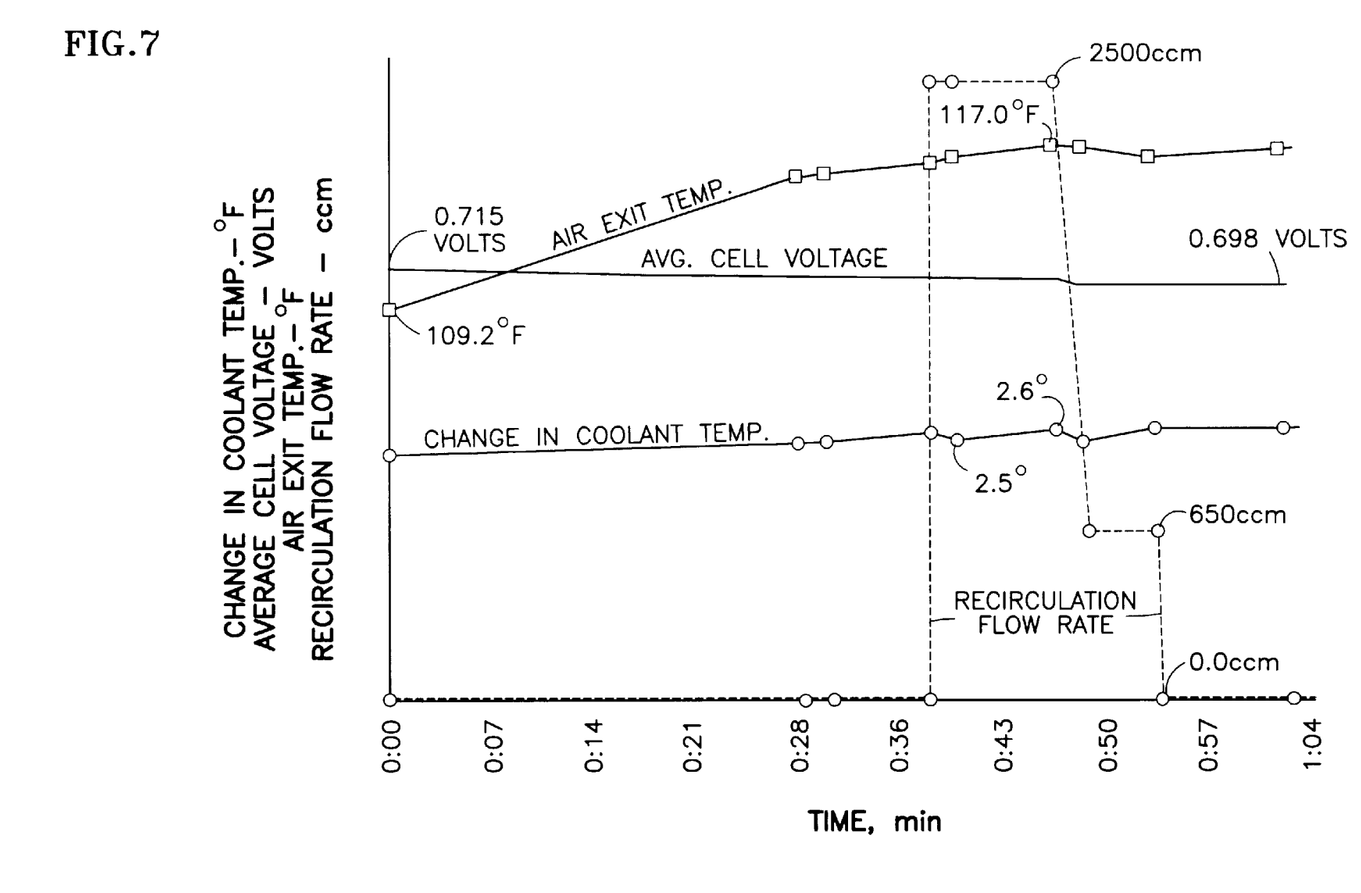
FIG. 7 is a plot of various fuel cell parameters as a function of time, with and without fuel being recirculated into the cathode stream.

Various fuel cell operating parameters were measured with and without the anode fuel exhaust recirculated into the cathode process air inlet stream. FIG. 7 illustrates the trend of these parameters during the test. In FIG. 7, testing begins with no fuel added to the cathode; at about 38 minutes later, the anode fuel exit is recirculated into the cathode process air inlet stream at a rate of 2500 ccm; at about 48 minutes, the rate of addition of fuel into the process air inlet stream is reduced to about 650 ccm; and at about 57 minutes, the flow of fuel into the process air is terminated. The data trends show that the parameters of cell voltage and cell temperature exhibited minimal changes as a result of injecting fuel into the process air.

Figure 6:
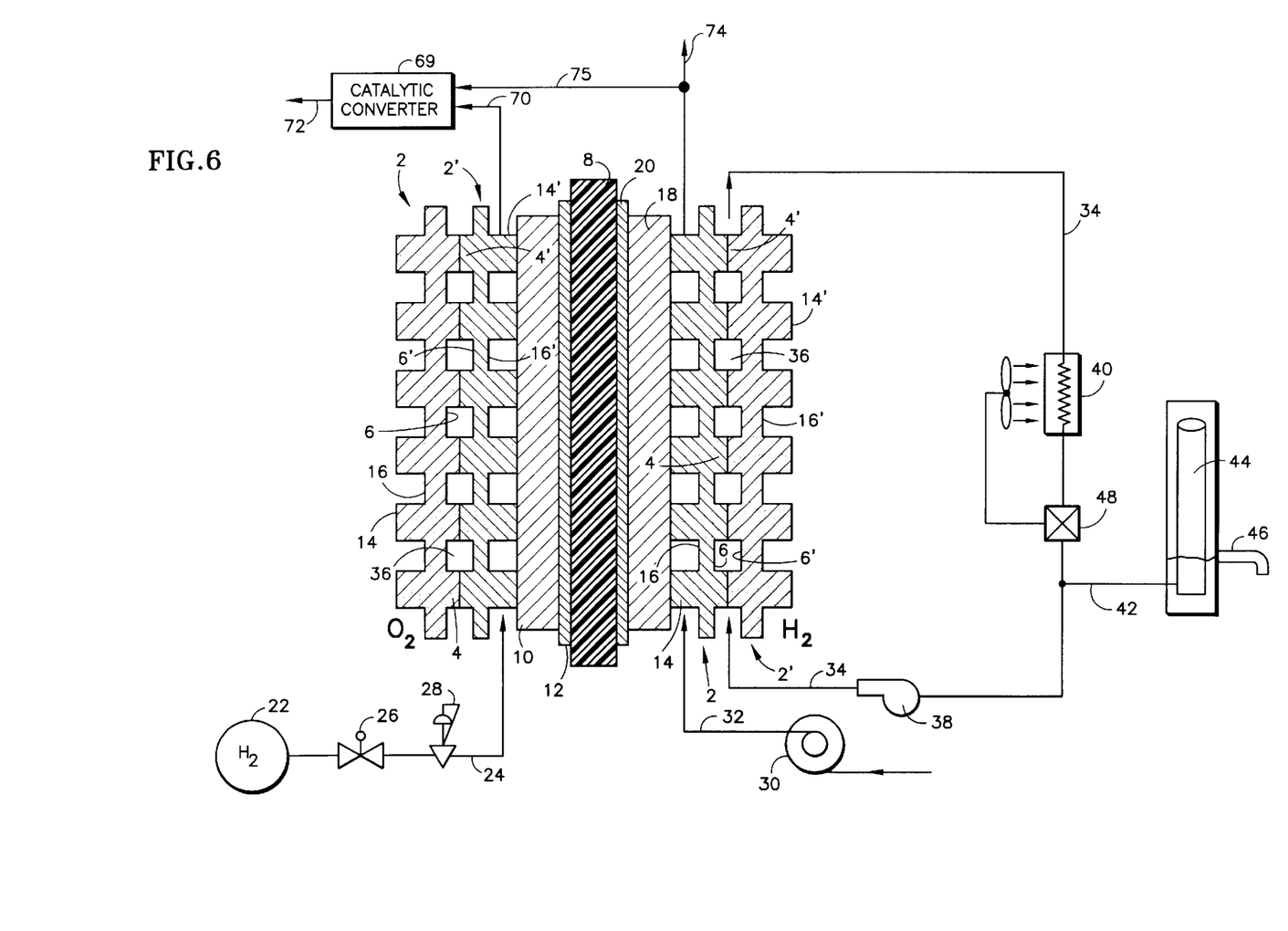
FIG. 6 is a stylized, schematic diagram of a portion of a fuel cell system in which the present invention is effected by passing the anode exhaust through a catalytic converter.

Another form of the invention, shown in FIG. 6, does not apply the anode effluent to the cathode flow field, but rather applies the anode effluent to a catalytic converter 69 via a line 70, the exhaust of which 72 is released to ambient. A portion of the cathode exhaust from the fuel cell in a line 74 is diverted to the catalytic converter in a line 75 to provide oxidant for the catalytic burning of fuel. The amount of fuel which must be consumed is so small that the catalytic converter 69 and need not be provided with any special cooling. This form of the invention may be provided by a separate catalytic converter, disposed in a vehicle remotely of the fuel cell, or it may be provided by a catalyst mounted within an anode exhaust manifold, in a fashion similar to the manifold described in commonly owned, copending U.S. patent application Ser. No. 169,405 filed Oct. 9, 1998, in another context. In any case, another source of air may be provided to the catalytic converter to react with the fuel which must be combusted.

The aforementioned patent and patent application are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell system for supplying electric power, comprising:

an electrolyte;

a cathode catalyst disposed between a cathode substrate and said electrolyte on one side of said electrolyte;

an anode catalyst disposed between an anode substrate and said electrolyte on the opposite side of said electrolyte;

a cathode flow field having an inlet for flowing an oxidant in contact with said cathode, said cathode flow field being vented to permit release of exhaust therefrom;

an oxidant pump providing oxidant to said cathode flow field inlet;

an anode flow field for allowing a stream of hydrogen to contact said anode, said anode flow field having an exhaust;

a source for providing hydrogen to said anode flow field; and an anode flow field exhaust line connecting the exhaust of said anode flow field to a hydrogen/oxidant catalytic surface, whereby hydrogen in the exhaust of said anode flow field will be combusted.

2. A fuel cell system according to claim 1 wherein:

said exhaust line connects said anode exhaust to said cathode flow field inlet, whereby said hydrogen/oxidant catalytic surface comprises the surface of said cathode substrate of said fuel cell.

3. A fuel cell system according to claim 2 wherein the exhaust of said cathode flow field is vented to ambient.

4. A fuel cell system according to claim 1 wherein said hydrogen/oxidant catalytic surface comprises a catalytic converter, separate from said fuel cell, having an oxidant inlet said anode flow field exhaust line connecting said anode flow field to said catalytic converter, the exhaust of said catalytic converter being vented to ambient.

5. A fuel cell system according to claim 4 wherein the exhaust of said cathode flow field is directed to said oxidant inlet of said catalytic converter.

6. A fuel cell system according to claim 1 wherein said hydrogen/oxidant catalytic surface comprises a catalytic converter having an oxidant inlet formed within an anode exit flow field manifold on said fuel cell, said anode flow field exhaust line comprising said manifold, the exhaust of said catalytic converter being vented to ambient.

7. A fuel cell system according to claim 6 wherein the exhaust of said cathode flow field is directed to said oxidant inlet of said catalytic converter.

8. A fuel cell system according to claim 1 wherein said oxidant is air.

9. A fuel cell system for supplying electric power, comprising:
   an electrolyte;
   a cathode catalyst disposed between a cathode substrate and said electrolyte on one side of said electrolyte;
   an anode catalyst disposed between an anode substrate and said electrolyte on the opposite side of said electrolyte;
   a cathode flow field, having an oxidant inlet, for flowing oxidant in contact with said cathode, said cathode flow field being vented to permit release of exhaust therefrom;
   an oxidant pump providing oxidant to said cathode flow field;
   an anode flow field for allowing a stream of hydrogen to contact said anode, said anode flow field having an exhaust;
   a source for providing hydrogen to said anode flow field; and
   an anode flow field exhaust line connecting the exhaust of said anode flow field to the oxidant inlet of said cathode flow field.

10. A fuel cell system according to claim 9 further comprising:
    a flow control valve in said anode flow field exhaust line.

11. A fuel cell system according to claim 10 wherein said valve is controlled to provide intermittent flow.

12. A fuel cell system according to claim 11 wherein said valve is controlled to provide intermittent flow in response to a predetermined time schedule.

13. A fuel cell system according to claim 10 wherein said valve meters flow in response to the amount of hydrogen in the mixture of the anode exhaust and the inlet oxidant at the inlet to said cathode flow field.

14. A fuel cell system according to claim 10 wherein said valve meters flow in response to gas composition in said anode flow field exhaust.

15. A fuel cell system according to claim 10 wherein said valve meters flow in response to current output of said fuel cell.

16. A fuel cell system according to claim 9 wherein said anode flow field is connected by said exhaust line downstream of said oxidant pump.

17. A fuel cell system according to claim 9 wherein said anode flow field is connected by said exhaust line upstream of said oxidant pump.

18. A fuel cell system according to claim 9 wherein said oxidant is air.

19. A fuel cell system according to claim 9 wherein the exhaust of said cathode flow field is vented to ambient.

* * * * *